United States Patent
McLean et al.

(10) Patent No.: US 12,532,067 B2
(45) Date of Patent: Jan. 20, 2026

(54) ROBOTIC AVATAR APPARATUS AND SYSTEM

(71) Applicants: Martha McLean, Ocala, FL (US); William McLean, Ocala, FL (US)

(72) Inventors: Martha McLean, Ocala, FL (US); William McLean, Ocala, FL (US)

( * ) Notice: Subject to any disclaimer, the term of this patent is extended or adjusted under 35 U.S.C. 154(b) by 0 days.

(21) Appl. No.: 18/332,062

(22) Filed: Jun. 9, 2023

(65) Prior Publication Data

US 2023/0345118 A1 Oct. 26, 2023

Related U.S. Application Data

(63) Continuation of application No. 17/373,943, filed on Jul. 13, 2021, now Pat. No. 11,729,498.

(60) Provisional application No. 63/050,960, filed on Jul. 13, 2020.

(51) Int. Cl.
*H04N 23/66* (2023.01)
*G06F 3/01* (2006.01)
*H04N 23/695* (2023.01)
*H04R 1/02* (2006.01)

(52) U.S. Cl.
CPC ........... *H04N 23/66* (2023.01); *H04N 23/695* (2023.01); *H04R 1/028* (2013.01); *G06F 3/012* (2013.01); *H04R 2499/15* (2013.01)

(58) Field of Classification Search
CPC ...... H04N 23/66; H04N 23/695; H04N 7/185; H04R 1/02; H04R 2499/15; H04R 2201/025; H04R 1/028; H04R 1/323; G06F 3/012; G06F 3/011; G06V 20/52
USPC .................................................. 348/115, 143
See application file for complete search history.

(56) References Cited

U.S. PATENT DOCUMENTS

| | | | |
|---|---|---|---|
| 9,344,842 B2 | 5/2016 | Huston | |
| 9,462,030 B2 | 10/2016 | Lueth et al. | |
| 9,591,336 B2 | 3/2017 | Cronin et al. | |
| 11,187,908 B2* | 11/2021 | Magyari | G02B 27/017 |
| 2004/0032536 A1 | 2/2004 | Islam et al. | |
| 2010/0073468 A1 | 3/2010 | Kutner | |
| 2019/0160679 A1* | 5/2019 | Durham | B25J 19/02 |

* cited by examiner

*Primary Examiner* — Yosef K Laekemariam
(74) *Attorney, Agent, or Firm* — Boudwin Intellectual Property Law, LLC; Daniel Boudwin

(57) ABSTRACT

A robotic avatar apparatus is provided. The robotic avatar apparatus includes a robotic avatar unit. The robotic avatar unit includes a camera, a processor and a unit signal transceiver. The camera is connected to the processor. The processor is connected to the unit signal transceiver. The robotic avatar apparatus also includes a user interface device. The user interface device includes a user signal transceiver and a display. The robotic avatar unit is designed to connect to the user interface device via a connection between the unit signal transceiver and the user signal transceiver.

11 Claims, 3 Drawing Sheets

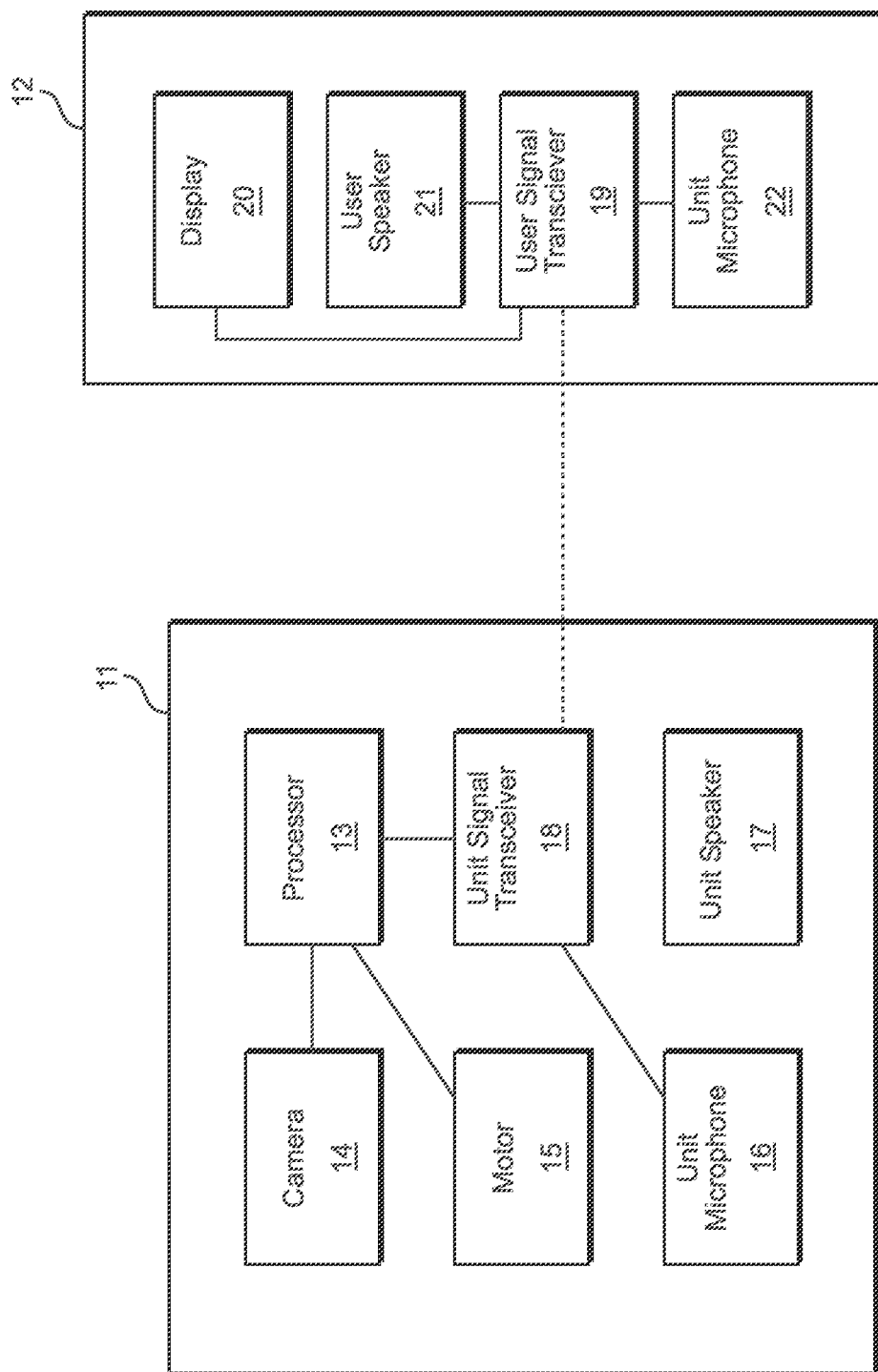

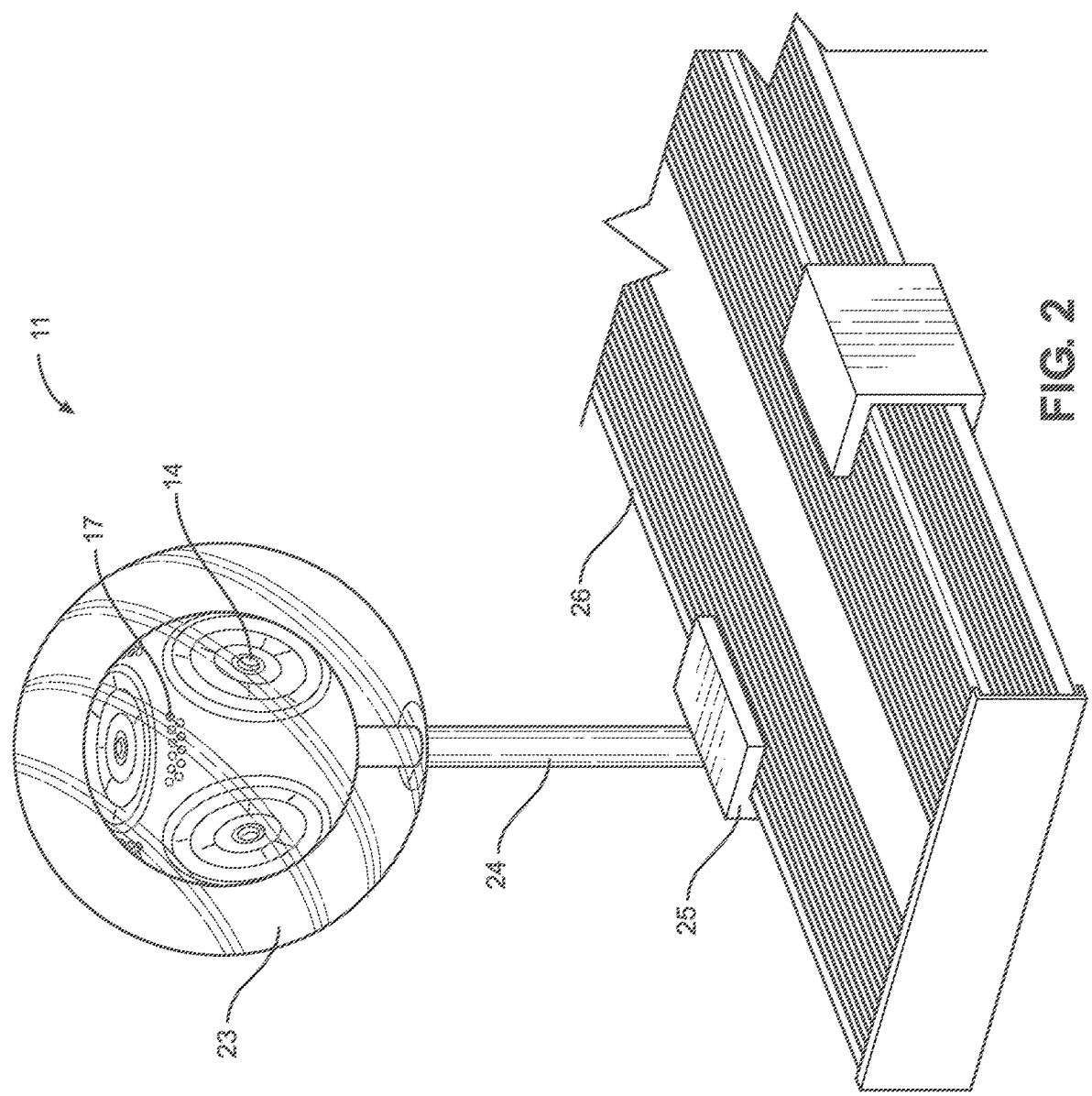

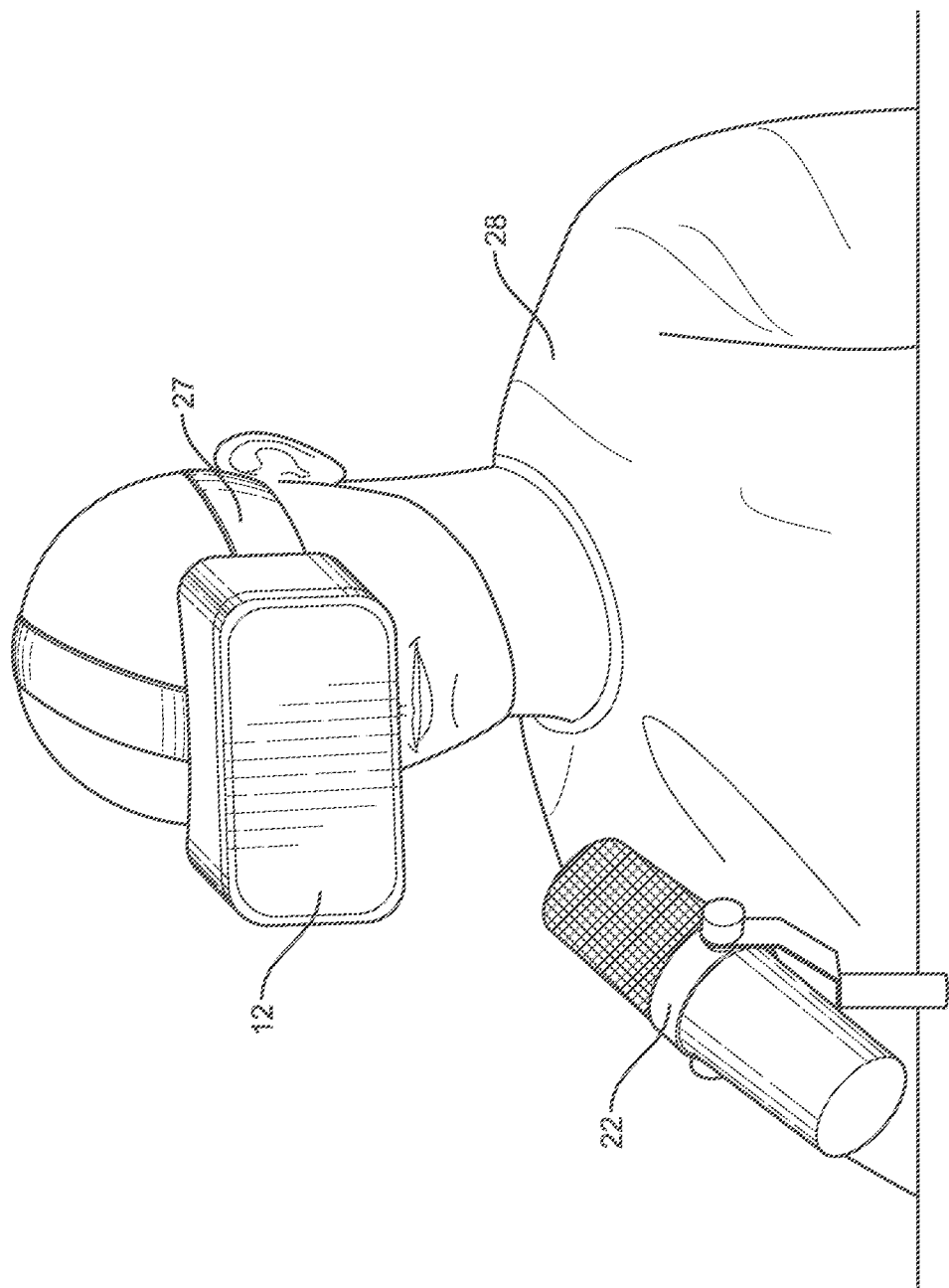

ROBOTIC AVATAR APPARATUS AND SYSTEM

CROSS REFERENCE TO RELATED APPLICATIONS

This application claims the benefit of U.S. Provisional Application No. 63/050,960 filed on Jul. 13, 2020, and as a continuation of U.S. Nonprovisional application Ser. No. 17/373,943 filed on Jul. 13, 2021. The above identified patent applications are herein incorporated by reference in their entirety to provide continuity of disclosure.

BACKGROUND OF THE INVENTION

The present invention relates to a robotic avatar apparatus and system. More specifically, the present invention provides a safe and effective mechanism to enjoy live events remotely.

Sporting events, concerts and other large-scale gatherings are enjoyable events that many people invest significant amounts of money into organizing, hosting and attending. Performers, hosts and event staff are able to generate revenue from these events, while attendees are able to witness their favorite athletes compete, their favorite musicians perform, and to observe talented individuals in any artistic or entertaining manner.

During large-scale events, such as global pandemics, many people may be unable to attend, forbidden, or discouraged from attending. For example, during the Covid-19 outbreak of 2019-2021, many concerts, events and professional and amateur sporting events were postponed indefinitely. When these events returned, many of them were subjected to strict social distancing requirements and personal protective equipment mandates that reduced the attendance at these events.

SUMMARY OF THE INVENTION

In view of the foregoing disadvantages inherent in the known types of remote event viewing options now present in the prior art, the present invention provides a robotic avatar apparatus and system wherein the same can be utilized for providing convenience for the user when interacting with a live event from a remote location.

The present system comprises a robotic avatar unit. The robotic avatar unit comprises a camera. The robotic avatar unit also comprises a processor. Furthermore, the robotic avatar unit comprises a unit signal transceiver. The camera of the robotic avatar unit is in operable connection with the processor. The processor is in operable connection with the unit signal transceiver.

The present system further comprises a user interface device. The user interface device comprises a user signal transceiver. Additionally, the user interface device also comprises a display. The robotic avatar unit is configured to connect to the user interface device via a connection between the unit signal transceiver and the user signal transceiver. As such image and video data from the robotic avatar unit may be transmitted to the user interface device.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a flow chart of an embodiment of the robotic avatar apparatus and system.

FIG. 2 shows a perspective view of an embodiment of a robotic avatar unit of the robotic avatar apparatus and system.

FIG. 3 shows a perspective view of an embodiment of user interface device of the robotic avatar apparatus and system.

DETAILED DESCRIPTION OF THE INVENTION

Reference is made herein to the attached drawings. Like reference numerals are used throughout the drawings to depict like or similar elements of the robotic avatar apparatus and system. The figures are intended for representative purposes only and should not be considered to be limiting in any respect.

Referring now to FIG. 1, there is shown a flow chart of an embodiment of the robotic avatar apparatus and system. The robotic avatar apparatus comprises a robotic avatar unit 11 and a user interface device 12. The robotic avatar unit 11 may be placed at a location of a live event, such as a concert or a sporting event. The user interface device 12 may be placed at a remote location, such as a home of a user. As such, the robotic avatar unit 11 will allow for an individual to experience elements of a live event from a remote location. The robotic avatar unit 11 could be assigned to a specific location via a ticketing system or the like.

The robotic avatar unit 11 comprises a camera 14. The camera 14 is designed to gather photographic and videographic data. In some embodiments, the camera 14 is a digital video recording camera, such that high quality digital video data may be gathered by the camera 14. In another embodiment, the camera 14 comprises a motor 15. The motor 15 is configured to enable manipulation of the camera 14. For example, the motor 15 may be utilized to change the direction the camera 14 is facing. Ideally, the motor 15 will be configured to swivel the camera 14 360 degrees and will be able to elevate and de-elevate the vertical position of the camera 14. Additionally, the camera 14 itself may comprise integrated zoom or pan functionalities to enable enhanced user control of the camera 14. In the illustrated embodiment, the robotic avatar unit 11 further comprises a unit microphone 16. The unit microphone 16 is configured to gather sounds from the location of the robotic avatar unit 11. In alternate embodiments, other types of intake data devices may be utilized.

The camera 14 is in operable connection with a processor 13. The processor 13 is configured to analyze or format the data gathered by the camera 14. The processor 13 is of any suitable design or configuration for performed the selected functions of the robotic avatar unit 11. Furthermore, the processor 13 is in operable connection with a unit signal transceiver 18. The unit signal transceiver 18 is configured to send and receive signals and data to and from the robotic avatar unit 11. As such, the data gathered by the robotic avatar unit 11 will be able to be transmitted.

The user interface device 12 may be any external device capable of operating the robotic avatar unit 11. For example, in some embodiments, the user interface device 12 may be a mobile phone or a computer. The user interface device 12 comprises a user signal transceiver 19. The user signal transceiver 19 is configured to send and receive data from the user interface device 12. The robotic avatar unit 11 can connect to the user interface device 12 via a connection between unit signal transceiver 18 and the user signal transceiver 19. The connection may be by any suitable means, such as through a cellular data network, a wireless internet network, or a wired internet connection. Ideally, the network on which the data would be transferred would be provided by the venue.

The user interface device 12 further comprises a display 20. The display 20 is configured to present image or video data gathered by the camera 14 of the robotic avatar unit 11. The display 20 may be of any suitable structure or configuration for displaying image or video data. The display 20 may be integrated directly with the user interface device 12 or may be a stand-alone device such as a television or a computer monitor. The user interface device 12, in the illustrated embodiment, further comprises a user speaker 21 and a user microphone 22. The user speaker 21 and the user microphone 22 are in operable connection with the user signal transceiver 19. As such, the user interface device 12 may be configured to send and receive audio data.

Referring now to FIG. 2, there is shown a perspective view of an embodiment of a robotic avatar unit of the robotic avatar apparatus and system. In the illustrated embodiment, the robotic avatar unit 11 comprises a housing 23. The housing 23 is disposed on a first end of a support frame 24. As demonstrated, the camera 14 and the unit speaker 17 are disposed on the housing 23. As such, the intake data will be gathered from a position in which interference from surrounding objects will be reduced. In the illustrated embodiment, the housing 23 is spherical in shape, such as to enable 360 degree viewing by rotation of the camera 14. However, in alternate embodiments, the housing 23 may be of an alternate shape. Furthermore, in the demonstrated embodiment, the housing 23 is made of a transparent material, such that the camera 14 will be able to record image and video data from outside of the housing 23.

In the illustrated embodiment, the support frame 24 consists of a vertically-oriented shaft. However, in alternate embodiments, the support frame 24 may be of any suitable structure for providing an elevated position to the camera 14 of the housing 23. The support frame 24 may be extendable and controllable by the processor of the robotic avatar unit, such as to enable the user to raise or lower the elevation of the camera 14. For example, the support frame 24 may be hydraulic. In other embodiments, the support frame 24 may be a static structure.

In the demonstrated embodiment, a fastener 25 is disposed on the support frame 24 opposite the housing 23. The fastener 25 is configured to secure the position of the housing 23 in a desired location. In the specific illustrated embodiment, the fastener 25 is a clamp, wherein the clamp consists of an upper member and a lower member. As shown, the lower member can extend under a desired surface, such as a bleacher 26 and apply pressure upward toward the upper member, thereby securing the housing 23 and the support frame 24 in a stable position.

Referring now to FIG. 3, there is shown a perspective view of an embodiment of user interface device of the robotic avatar apparatus and system. In the illustrated embodiment, the user interface device 12 comprises a wearable interface 27. Specifically, in the illustrated embodiment, the wearable interface 27 comprises a visual overlay secured to the face of the user 26 via a strap. Furthermore, in the illustrated embodiment, the user microphone 22 is an external microphone. In alternate embodiments, the user microphone 22 may be integrated upon the user interface device 12 itself. The wearable interface 27 may comprise a motion sensor configured to detect motion of the user 26. As such, the view provided on the display of the wearable interface 27 will correspond to the position of the camera of the robotic avatar unit via the processor.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A robotic avatar apparatus, comprising:
a robotic avatar unit;
the robotic avatar unit comprising a camera;
the robotic avatar unit comprising a processor;
the robotic avatar unit comprising a unit signal transceiver;
the camera in operable connection with the processor;
the processor in operable connection with the unit signal transceiver;
a user interface device;
the user interface device comprising a user signal transceiver;
the user interface device comprising a display; and
the robotic avatar unit configured to connect to the user interface device via a connection between the unit signal transceiver and the user signal transceiver;
wherein the robotic avatar unit further comprises a motor, wherein the motor is configured to manipulate the position of the camera; and
wherein the robotic avatar unit further comprises a unit microphone in operable connection with the unit signal transceiver.

2. The robotic avatar apparatus of claim 1, wherein the robotic avatar unit further comprises a unit speaker.

3. The robotic avatar apparatus of claim 1, wherein the user interface device comprises a user microphone in operable connection with the user signal transceiver.

4. The robotic avatar apparatus of claim 1, wherein the user interface device comprises a user speaker.

5. The robotic avatar apparatus of claim 1, wherein the housing is spherical and composed of a transparent material.

6. The robotic avatar apparatus of claim 1, wherein the support frame is a vertically-oriented shaft.

7. The robotic avatar apparatus of claim 1, wherein the fastener is a clamp.

8. The robotic avatar apparatus of claim 1, wherein the user interface device comprises a wearable interface.

9. The robotic avatar apparatus of claim 8, wherein the wearable interface comprises a strap.

10. The robotic avatar apparatus of claim 1, wherein the robotic avatar unit is configured to connect to the user interface device via a direct connection between the unit signal transceiver and the user signal transceiver.

11. The robotic avatar apparatus of claim 1, wherein the robotic avatar unit comprises a housing, the housing disposed on a first end of a support frame opposite a fastener.

* * * * *